United States Patent

Sitters et al.

[11] Patent Number: 5,885,309
[45] Date of Patent: Mar. 23, 1999

[54] METHOD OF MANUFACTURING AN ELECTROCHEMICAL CELL

[75] Inventors: Eric Franciscus Sitters; Frederik Hendrik Van Heuveln, both of Alkmaar, Netherlands

[73] Assignee: Stichting Energieonderzoek Centrum Nederland, Petten, Netherlands

[21] Appl. No.: 793,846

[22] PCT Filed: Sep. 8, 1995

[86] PCT No.: PCT/NL95/00306

§ 371 Date: Mar. 10, 1997

§ 102(e) Date: Mar. 10, 1997

[87] PCT Pub. No.: WO96/08050

PCT Pub. Date: Mar. 14, 1996

[30] Foreign Application Priority Data

Sep. 9, 1994 [NL] Netherlands ............... 9401481

[51] Int. Cl.⁶ .................................... H01M 6/00
[52] U.S. Cl. ........................ 29/623.1; 29/623.5
[58] Field of Search ............... 29/623.5, 623.1; 429/40, 42, 45

[56] References Cited

U.S. PATENT DOCUMENTS 5,356,731 10/1994 Sitters et al. ............... 429/45 X

FOREIGN PATENT DOCUMENTS

| 0 473 236 | 3/1992 | European Pat. Off. . |
| 40 30 904 | 4/1992 | Germany . |
| 40 30 944 | 4/1992 | Germany . |
| 5-335021 | 12/1993 | Japan . |
| WO 94/18713 | 8/1994 | WIPO . |

*Primary Examiner*—Anthony Skapars
*Attorney, Agent, or Firm*—Young & Thompson

[57] ABSTRACT

In order to improve the electrical contact between electrode (1) and current collector (13) in a fuel cell containing a liquid carbonate (10) as the electrolyte it is proposed that between the electrode and the current collector a functional layer (12) be placed. The electrode (11) consists of a material based on lithium cobaltate, and the functional layer (12) is attached thereto. This functional layer, like the electrode, is preferably applied in the green state, and after assembly of the cell, the ultimate electrochemical fuel cell is obtained by sintering.

4 Claims, 2 Drawing Sheets

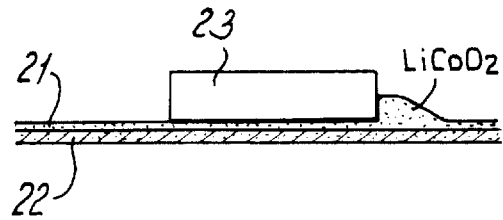
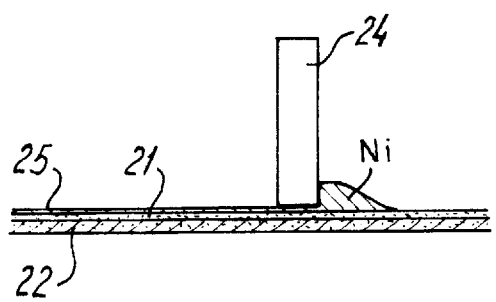
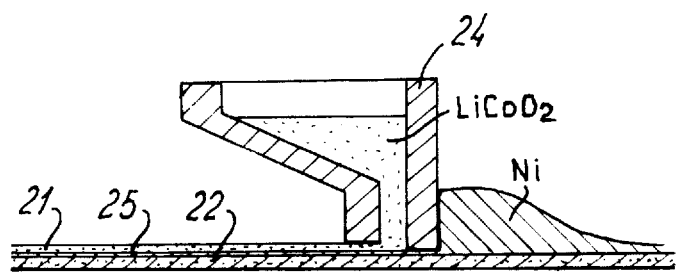

METHOD OF MANUFACTURING AN ELECTROCHEMICAL CELL

FIELD OF THE INVENTION

The present invention relates to a method of manufacturing an electrochemical cell having an electrolyte based on molten carbonate.

BACKGROUND OF THE INVENTION

Such a method is known from the German Offenlegungsschrift 40 30 904. There, nickel oxide is used in the electrodes. Between the electrodes and the current collector, a so-called functional layer is employed which improves the contact between electrode and current collector. In the this Offenlegungsschrift it is proposed to place a "green" foil between the electrode and the current collector and then to bake out this material.

The use of nickel oxide in the electrodes in the first instance provides an effective electrochemical cell, more in particular a fuel cell, but in the long term it was found that internal short circuits arise. Consequently, the use of nickel oxide electrodes is undesirable.

It has been proposed, in the prior art, to employ lithium cobaltate instead. It was found that this presents greater problems than in the case of an electrode based on nickel oxide, which relate to the transition resistance between electrode and current collector.

If, however, a functional layer is used such as that proposed in the above-mentioned German Offenlegungsschrift 40 30 904, it was found that, as the cell warms up, diffusion of carbonate material takes place between the electrode, which for example is in the green state, and the functional layer, as a result of which the effect of the functional layer is lost and the transition resistance increases.

SUMMARY OF THE INVENTION

The object of the present invention is to avoid the above-described drawbacks and to provide a fuel cell with electrodes having, on the one hand, an adequate service life and, on the other hand, a low transition resistance between electrode and current collector by virtue of an effective functional layer being employed.

This object is accomplished for an above-described method by employing a $LiCoO_2$-based electrode material, and attaching the functional layer and the electrode to each other before placement in a cell stack.

It was found that the use of green lithium cobaltate in conjunction with a green functional layer is possible, if said functional layer is attached to the electrode before this assembly is combined into a cell.

This attachment operation can take place in any manner known in the prior art.

If the tape casting technique is employed, the electrode can be fabricated by this method. Then the functional layer can be applied by spraying, screen printing and the like.

It is also, and preferably, possible to fabricate both the functional layer and the electrode by a tape casting technique and combine them immediately thereafter. The solvent employed for the binder of both the electrode and the functional layer preferably has the same basis.

By applying a transition layer or functional layer it is possible to reduce the electrical resistance between the electrode and the metal of the current collector. By virtue of this layer being applied in a deformable state to the current collector it is possible to absorb surface unevenness on the current collector. The same applies to unevenness on the side of the electrode. In the case of use in conjunction with gas ducts, the gas distribution underneath the current collection points can be improved. When the fuel cell is warmed up (for example in the case of fuel cells being stacked) the separate components to be assembled consist, according to the invention, of materials of a similar type. This means that during start-up and operation only metal-metal or, for example, oxide-oxide contacts are formed and preferably no metal-oxide contacts. It is moreover important for the invention that prior to, during and after these contacts being formed, corrosion problems do not arise, particularly at the interface of the (stainless steel) current collector and the electrode. Corrosion worsens the electrical contact.

It has been found in certain cases that, after sintering, the thin layer, on the one hand, is absorbed (in part) by the current collector and, on the other hand, (in part) by the electrode, so that it can no longer be distinguished in a sharply defined manner. The above-described objectives are achieved, however. The layer being (in part) absorbed by the current collector indicates that contact formation is not adversely affected by (premature) corrosion. The thin, comparatively soft layer can be applied to the electrode or to the current collector (or optionally corrugation plate) in any way known in the prior art. In the first case, when being applied to the electrode, the layer will preferably contain metal particles for the subsequent formation, during sintering, of a contact with the current collector. In the second case, when being applied to the current collector or corrugation plate, the layer will preferably contain electrode material or similar material (oxide) for the contact to be formed subsequently with the electrode. One possible way of applying it is by means of tape casting, the same method which is used for the fabrication of electrodes. A corresponding alternative possibility is screen printing. It is also possible to fabricate the layer at the same time as the electrode and to position the green assembly thus formed on the current collector. Sintering can then take place. In the above-described manner, sintering can be accomplished at the same time as the fuel cell being started up for the first time. Thus it is possible for the cell during start-up to be heated for several hours to approximately 500° C., in order to bake out the necessarily present binder and to melt the electrolyte. Then the cell can be heated to 650° C. This applies particularly to a molten-carbonate cell.

It was found, in particular in the case of the molten-carbonate fuel cell, that, if a stainless steel current collector and a thin nickel-containing layer according to the invention, applied to the electrode (cathode), are employed, the nickel material diffuses into the stainless steel and thus provides adhesion between current collector and electrode. Owing to the high nickel percentage, the oxidation resistance of the current collector increases. Surprisingly it was found that the nickel material does not diffuse into the adjacent electrode or cathode, respectively, so that the properties thereof are unchanged.

A corresponding effect has been observed when cobalt was used as the metal in the interlayer.

The thickness of the functional layer can be between 20 $\mu$m and 150 $\mu$m. The thickness of the electrode is in the order of magnitude of tenths of millimeters.

The invention also relates to an electrochemical cell comprising green components.

The metal employed in the functional layer preferably comprises a metal from the iron group.

As stated hereinabove, it is often difficult to distinguish clearly the presence of the layer according to the invention in the cell in operation.

The invention will be explained below in more detail in the case of a molten-carbonate fuel cell being employed and more in particular with reference to the interface between cathode and current collector.

In the molten-carbonate fuel cell in question, lithium cobaltate ($LiCoO_2$) was employed as the cathode material. This material has advantages with respect to a cell which is provided with the more customary nickel oxide (NiO) cathode. This relates especially to the service life. If the lithium cobaltate is moreover applied as a green tape, handling is easier and a reduction in cost is achieved, compared with a component sintered beforehand. According to the invention it is proposed to provide this green tape with a thin tape which contains metal powder, the transition resistance between the cathode/current collector being considerably reduced as a result.

The above-described lithium cobaltate is preferably employed as a powder. This can be obtained in any way known in the prior art. In the present example, the powder was obtained via a solid-state reaction between cobalt powder and lithium carbonate. Then, by means of the tape casting method (doctor blade), a lithium cobaltate tape is produced. During said process a suspension is made from the powder, which consists of solvent, binder, dispersant, surfactants, anti-foaming agents and optionally other additives such as pore-forming materials. It does not matter in this context whether the solvent is organic or water-based. The tapes produced in this manner can be cut to size immediately after drying and can be used in a molten-carbonate fuel cell. Any remainders can, after baking and grinding, be used for a subsequent suspension preparation.

Onto the tapes thus obtained, according to the invention a second tape is cast comprising a metal powder. This tape can be thinner than the above-described tape and for example has a thickness between 20 and 150 $\mu$m. It is also possible to cast both tapes simultaneously in one process. The best results are achieved by employing a metal which also occurs in the current collector and does not or virtually does not react to give a lithium-M(metal)-O compound. If the current collector is made of stainless steel and the tape of lithium cobaltate, as specified above, the best results are obtained with nickel or cobalt.

Moreover it is found that the stainless steel current collector no longer has to be clad with cobalt, which results in a considerable cost saving.

BRIEF DESCRIPTION OF THE DRAWINGS

The invention will be illustrated hereinafter with reference to one embodiment.

DETAILED DESCRIPTION OF THE INVENTION

Figure 1:
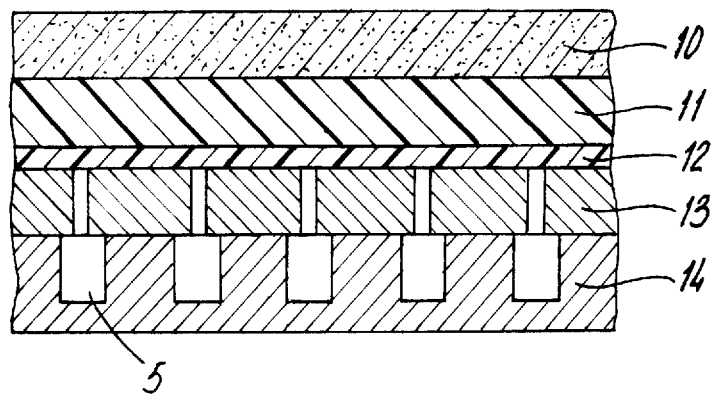
FIG. 1 showing the construction of a molten-carbonate fuel cell according to the invention, FIGS. 2a and 2b showing a first way of double tape casting, and FIG. 3 showing a second way of double tape casting.

FIG. 1 shows a portion of a molten-carbonate cell in a cross-sectional view.

There, 10 represents the electrolyte in the $Li-Al-O_2$ matrix, 11 the $LiCoO_2$ cathode tape, 12 the tape interlayer, 13 the stainless steel current collector, and 14 the stainless steel corrugation plate.

5 indicates gas ducts.

FIG. 2 shows a first embodiment for employing double tape casting. This involves, as shown in FIG. 2a, applying a layer 21 of tape material to a flat support 22. The tape material may comprise $LiCoO_2$. Then a broad knife 23 is employed to ensure the homogeneous thickness of said tape layer. In so doing, the broad knife can either be moved across the layer of tape material 21, or the layer of tape material 21 can be moved past the knife together with the underlying supporting surface 22.

The material from which an $LiCoO_2$ tape is cast is prepared in the following manner:

$LiCoO_2$ powder, ethanol and tween (surfactant) are mixed together. Then methyl cellulose (binder material), demineralized water and TBP (solvent) are added, with continuous stirring.

Then, with the aid of the construction shown in FIG. 2a, a tape is cast.

In a manner not shown a drying cap is positioned over the cast tape in order to accomplish drying under optimal conditions. After this thicker tape obtained, i.e. the electrode material proper, has been dried, a thinner second tape 25 is applied in the same manner, as shown in FIG. 2b. In so doing, a narrow knife 24 is used.

The nickel suspension employed for tape casting in FIG. 2b is prepared by mixing nickel powder, methyl cellulose, tween, TBP and ethanol. After some time, demineralized water is added and the mixture is stirred for half an hour.

Then the functional nickel layer is cast.

FIG. 3 shows a second variation of double casting of a tape, such a double tape being produced in one step. An $LiCoO_2$ suspension is prepared in the above-described manner, as is a nickel suspension.

In the process, the nickel-containing layer 25 is applied to the support 22, and then the electrode material 21 is placed on top of this. The right-hand side of the reservoir which contains $LiCoO_2$ here serves as a (narrow) knife.

After the double tape has been produced, it is placed under a cap, in the above-described manner, and is then dried.

Adhesion between the functional layer (or Ni layer) and the electrode layer ($LiCoO_2$ layer) obtained by means of the above method is so good that if the double tape is, for example, rolled up and unrolled again, the layers do not come apart. This is partly caused by the two materials, during casting, mixing to a small extent on the boundary layer and diffusing into each other. This is possible, inter alia, due to an identical solvent being used.

The following experiment was carried out with the cell shown in FIG. 2:

EXAMPLE

A 100 $cm^2$ cell was assembled using $LiCoO_2$ tape as the cathode and, on top of this, a Ni tape according to the invention having a thickness of 50 $\mu$m, and in addition the customary components for a molten-carbonate fuel cell. The cell gave a good and stable performance, approximately 790 mV during the duration of the test of 1000 hours, which is not achieved without the interlayer. When the cell was taken apart it was found that during operation a firm contact with the current collector existed. No undesirable nickel deposits were found in the electrode or the electrolyte.

Although the invention has been described hereinabove with reference to a preferred embodiment, it should be understood that numerous modifications thereof are possible without departing from the scope of the present application. The above shows that many variations are possible for the interlayer, while the method for applying it is not limited to the above-described. Thus it is possible for a completely finished electrode to be provided first and for the interlayer according to the invention to be applied in the green state between said electrode and the current collector or separator plate, respectively, and for all of these to be sintered. The sintering can be accomplished as a separate step.

What is claimed is:

1. In a method of fabricating an electrochemical cell having an electrolyte based on molten metal, which method comprises:

providing a cell stack;

bringing the cell stack to an elevated temperature;

providing an electrode/current collector assembly comprising an electrode and a metallic current collector; and placing a functional layer between the electrode and the metallic current collector;

the improvement which comprises:

utilizing a cobaltate-based material as the electrode material; and attaching the functional layer and the electrode to each other, prior to placement in the stack.

2. Method according to claim 1, wherein the step of attaching the functional layer and the electrode to each other comprises providing one of the electrode and the functional layer and applying thereunto the other of the functional layer and the electrode.

3. Method according to claim 2, wherein the step of providing one of the electrode and the functional layer comprises fabricating a part comprised of said one of the electrode and the functional layer, then applying the other of the functional layer and the electrode to said part.

4. Method according to claim 2, further comprising using a binder both during the fabrication of the electrode and the functional layer, and utilizing a solvent for the binder having the same basis.

* * * * *